Nov. 24, 1953  B. FAURE  2,659,946
MOLDING MACHINE
Filed Sept. 10, 1951
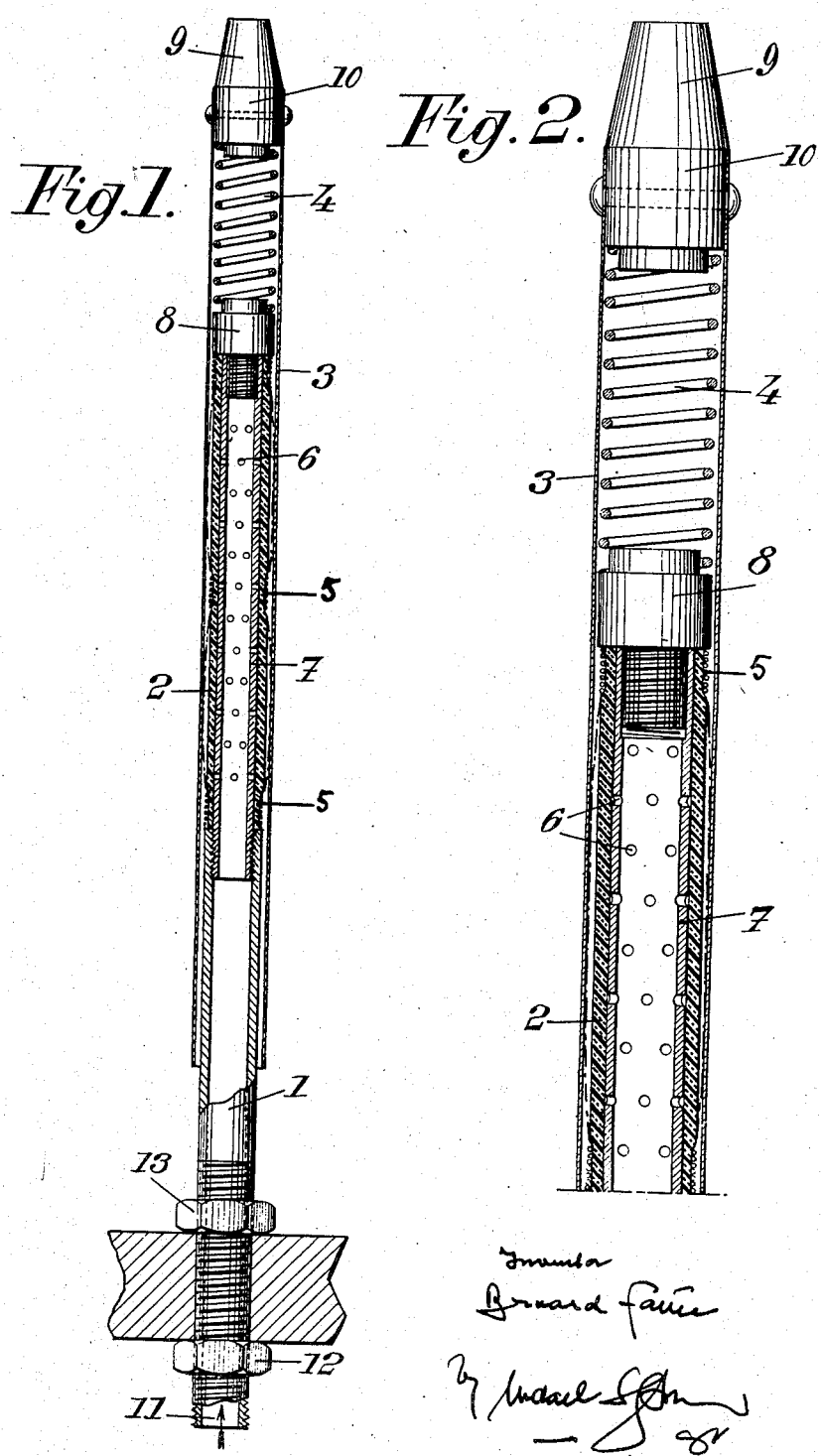

UNITED STATES PATENT OFFICE 2,659,946

MOLDING MACHINE

Bernard Faure, Neuilly-sur-Seine, France

Application September 10, 1951, Serial No. 245,926

Claims priority, application France September 9, 1950

6 Claims. (Cl. 22—48)

Whatever the type of moulding machine used, the mould removal always involves a relative displacement between the mould and the model-carrying plate.

If this displacement is effected without any precaution, it may cause a deterioration of the imprint in the moulding sand, deterioration which foundry men call "tearing off."

Tearing off has been avoided heretofore, to the utmost possible extent by modifying, in a suitable manner the shape of the parts to be moulded, and by increasing the taper. This manner of operating gives rise to objectionable excess thicknesses, particularly objectionable in case of later machining. Certain parts do not allow the use of such a method.

Instead of modifying the contour of the part to be moulded it is preferable to effect the relative displacement of the mould and model carrying plate in such a manner that tearing off cannot occur. To this effect, it is necessary and sufficient that the displacement be effected as a simple translation, parallel with the axis of the moulding machine therefore vertical, without any extraneous tipping.

This condition is fulfilled by using machines strictly accurate, kept in perfect condition with perfectly dimensioned guiding elements and by using on these machines only perfectly trued moulding boxes. This two-fold condition of an excellent quality of the machines on the one hand and of the precision of moulding boxes on the other hand, is a heavy constraint in an industry where equipment is often handled roughly and in bad condition, mechanically, from dust and shocks.

It is possible, also, to effect the above mentioned translation by providing, as some constructors do, the ends of the four push-elements raising the box with a movable threaded portion, of the type of a blind nut. In such a case, the moulding boxes may be used as presented and it is sufficient, before the mould removing operation, for an operator to adjust by hand said blind nut so as to bring them in contact with the moulding box. From that time the raising of the four corners of the moulding box may begin and it takes place as if the bottom of the moulding box were perfectly straight.

This method of operation makes it possible to utilize a worn equipment, or not very accurate equipment, and it has no other drawback than requiring, at each mould removal, the fairly long intervention of a workman. On the one hand, this intervention cannot be effected with all desirable care and, on the other hand, it is no longer conceivable when dealing with a high production foundry, as the duration of said intervention is of the same order as that corresponding to the production of a mould.

With a view to obviating the above drawbacks, objects of the present invention are improvements in moulding machines such that the relative displacement of the mould and model-carrying plate during the mould removal is effected automatically according to a vertical translation motion.

These improvements bear on the push-elements or similar elements, used for raising the moulding box, and consist essentially in making each one of these push elements in two portions interconnected through an elastic link, in such a manner that its length is adapted automatically, once the moulding box is in position, one of said portions comprising a socket shaped extension so as to surround the other portion over part of its length, and these two portions can also be immobilized automatically, with respect to each other, by the action of a device, preferably elastic, carried by one of the portions making up the push element.

These improvements comprise, preferably, all or part of the following arrangements, separately or together:

(1) The elastic link between the two portions of the push element consists of a metal spring, bearing against each one of said portions.

(2) The elastic linking device for immobilizing these two portions with respect to each other consists of a tight elastic sheath, of rubber for instance, completely surrounding one of the portions over part of its length and capable of expanding under the action of a fluid under pressure, so as to press against the other portion.

The following description relates to a push element for a moulding machine, given by way of a non limitative example and with reference to the appended drawing in which:

Figure 1 shows a schematic longitudinal section of the push element.

Figure 2 shows the same section, at a larger scale, of the head of said push element.

This push element consists of two portions; on the one hand the rod 1, extended by the tube 7, also hollow, the wall of which is bored with holes such as 6, this tube 7 being surrounded with a rubber sheath 2; on the other hand, the socket or envelope 3 which surrounds the rod 7 and the rod 1 over a portion of their length and terminates into a shoulder 10 extended by an end 9, Between these two portions, a spring 4 bears, on one hand on a shoulder 8 at the end of the tube 7 and, on the other hand on the shoulder 10 at the end of the socket or envelope 3.

At its base, at 11, the tube 1 may communicate with the compressed air source which supplies the moulding machine. This compressed air, through the tube 7 and the holes 6, thus reaches the inside of the flexible sheath 2.

Nuts 12 or 13, or any suitable device allow the securing of the push element on the machine.

The push elements are adjusted at the four corners of the moulding box in such a manner that, at rest, they protrude from the plane of the model carrying plate by a few centimeters. The compressed air not being applied to the push elements the latter can thus collapse under the weight of the empty moulding boxes, compressing the spring contained inside each one of them.

If one of the corners of the moulding box is depressed less than the three other ones, the corresponding push element collapses to a lesser degree.

The moulding box being set in position, moulding is effected normally and upon removing the box, at the time of sending the fluid for raising the mould, there is sent, simultaneously, or better still, slightly in advance, the same fluid in each one of the push elements thus constituted. The fluid under pressure causes the expansion, the contour of which is indicated on the appended figures, of the rubber sheath 2 contained inside each push element, and this radial and concentrical expansion wedges and associates the two portions of the push element which were previously free with respect to each other.

At that time the raising operation can begin. The level differences have been automatically compensated. As soon as the machine has come back to its zero point and all elements have been drained of the driving fluid, the push elements resume their freedom and will adapt themselves to a new moulding box.

The rubber sheath 2 should be secured on the tube 7 by at least two binders such as 5. The contact between the two portions of the push element, therefore its rigidity, is improved by increasing the number of these tyings 5 so as to partition said sheath inside. The present example comprises three such tyings. Preferably, such a push element should comprise three or four.

The present improvements to moulding machines allow a large number of variants, within the scope of the present invention.

(1) The elastic device between the two portions of the push element, consisting of a spring in the above example, may be realized in any shape, pneumatic, for instance.

(2) It may be located at any point along the length of the push element.

(3) The device wedging the two portions of the push element with respect to each other is not necessarily pneumatic as in the above example; it may be effected in any manner mechanical, electrical etc.

Finally, the present arrangements which make it possible to obtain a push element as described above, may, within the scope of the present invention, be introduced in the construction of moulding machines in elements which would not necessarily be push elements, properly speaking, but which would play their parts in mould-removing. Such would be the case, for example, of a moulding machine in which the present arrangements would be applied to push element supports, intermediate parts used for mould removal etc.

What is claimed is:

1. A push element for removing the mold from a molding machine comprising, in combination, a first tubular member; a second tubular member slidably arranged within said first tubular member; resilient means arranged within said first tubular member and urging said first and second tubular members into an expanded position with respect to each other; an elastic sheath arranged between said first and second tubular members; and means for inflating said elastic sheath, whereby said elastic sheath in uninflated condition permits a sliding of said tubular members with respect to each other and in inflated condition forms a rigid connection between tubular members.

2. A push element for removing the mold from a molding machine comprising, in combination, a first tubular member; a second tubular member slidably arranged within said first tubular member, said second tubular member having a plurality of perforations and being closed at one end thereof; resilient means arranged within said first tubular member and abutting against said closed end of said second tubular member so as to urge said first and second tubular members into an expanded position with respect to each other; and an elastic sheath arranged on the outside of said second tubular member so as to be superimposed to said perforations thereof, whereby when said elastic sheath is inflated by admission of compressed air into said second tubular member it forms a rigid connection between said tubular members, said elastic sheath in uninflated condition being separated from said first tubular member so as to permit a sliding of said tubular members with respect to each other.

3. A push element for removing the mold from a molding machine comprising, in combination, a first tubular member; a second tubular member slidably arranged within said first tubular member; resilient means arranged within said first tubular member and urging said first and second tubular members into an expanded position with respect to each other; a rubber tube arranged between said first and second tubular members; and means for inflating said rubber tube, whereby said rubber tube in uninflated condition permits a sliding of said tubular members with respect to each other and in inflated condition forms a rigid connection between said tubular members.

4. A push element for removing the mold from a molding machine comprising, in combination, a first tubular member; a second tubular member slidably arranged within said first tubular member, said second tubular member having a plurality of perforations and being closed at one end thereof; resilient means arranged within said first tubular member and abutting against said closed end of said second tubular member so as to urge said first and second tubular members into an expanded position with respect to each other; and a rubber tube arranged on the outside of said second tubular member so as to be superimposed over said perforations thereof, whereby when said rubber tube is inflated by admission of compressed air into said second tubular member it forms a rigid connection between said tubular members, said rubber tube in uninflated condition being separated from said first tubular member so as to permit a sliding of said tubular members with respect to each other.

5. A push element for removing the mold from a molding machine comprising, in combination, a first tubular member, a second tubular member slidably arranged within said first tubular member, said second tubular member having a plurality of perforations and being closed at one end thereof; resilient means arranged within said first tubular member and abutting against said closed end of said second tubular member so as to urge said first and second tubular members into an expanded position with respect to each other; an elastic sheath arranged on the outside of said second tubular member so as to be superimposed over said perforations thereof, whereby when said elastic sheath is inflated by admission of compressed air into said second tubular member it forms a rigid connection between said tubular members, said elastic sheath in uninflated condition being separated from said first tubular member so as to permit a sliding of said tubular members with respect to each other; and means for tying parts of said elastic sheath to the outside of said second tubular member.

6. A push element for removing the mold from a molding machine comprising, in combination, a first tubular member; a second tubular member slidably arranged within said first tubular member, said second tubular member having a plurality of perforations and being closed at one end thereof; resilient means arranged within said first tubular member and abutting against said closed end of said second tubular member so as to urge said first and second tubular members into an expanded position with respect to each other; a rubber tube arranged on the outside of said second tubular member so as to be superimposed over said perforations thereof, whereby when said rubber tube is inflated by admission of compressed air into said second tubular member it forms a rigid connection between said tubular members, said rubber tube in uninflated condition being separated from said first tubular member so as to permit a sliding of said tubular members with respect to each other; and means for tying parts of said rubber tube to the outside of said second tubular member.

BERNARD FAURE.

References Cited in the file of this patent

UNITED STATES PATENTS

| Number | Name | Date |
| --- | --- | --- |
| 2,376,203 | Stemmler et al. | May 15, 1945 |
| 2,559,647 | Legere | July 10, 1951 |

FOREIGN PATENTS

| Number | Country | Date |
| --- | --- | --- |
| 1,024,442 | France | Jan. 10, 1953 |